Patented July 14, 1936

2,047,218

UNITED STATES PATENT OFFICE 2,047,218

COMPOSITIONS COMPRISING DEACETYLATED CHITIN

Warner J. Merrill, Wilmington, Del., assignor to E. I. du Pont de Nemours & Company, Wilmington, Del., a corporation of Delaware No Drawing. Application June 21, 1934, Serial No. 731,602

21 Claims. (Cl. 91—68)

This invention relates to new compositions of matter comprising cellulosic compositions, fabrics and the like, together with deacetylated chitin, and more particularly to the sizing of fabrics with deacetylated chitin.

Chitin occurs in nature in various forms and particularly in the horny exo-skeletons of crabs, lobsters, shrimp and other crustacea and of insects such as grass-hoppers and beetles, as well as in cartilage and the like. Chitin, the chief constituent of the horny exo-skeleton of crustacea and of insects is composed largely of acetylated hexose amine polymers. The building stone of chitin is acetylated chitosamine and chitin is similar to cellulose, the glucose structural unit of cellulose being replaced by acetylated chitosamine.

The deacetylation of chitin to a substantially undegraded, at least partially deacetylated chitin, is disclosed in copending application of George W. Rigby Serial No. 731,600 of June 21, 1934. In this same application there are disclosed methods for the preparation of useful salts of the deacetylated chitin.

This invention has as an object the preparation of new cellulosic compositions comprising a cellulosic substance and a substantially undegraded, at least partially deacetylated, chitin. A further object is the preparation of molded objects from such compositions. A further object is the new class of articles of manufacture prepared by the above processes. A still further object is the production of fabrics, filaments or fibrous materials having a laundry-fast size. A still further object is the production of fabrics having a durable attractive finish. A still further object is the class of new fabrics thus prepared. Other objects will appear hereinafter.

These objects are accomplished by the following invention wherein partially deacetylated chitin is associated with, impregnated into, or coated upon a cellulosic substance, a fabric, filament or other fibrous material to form new and useful articles of manufacture.

The preparation of a suitable deacetylated chitin is as follows:—

Shrimp, lobster or crab shells are treated, first, with a 1% solution of soda ash at the boiling temperature for about six hours, then filtered, washed until neutral to phenolphthalein and then treated with 5% hydrochloric acid until all lime salts have been removed. After washing to remove the acid completely, the shells are given a second alkaline treatment with 1% soda ash containing about .02% of soap. The shells are then filtered and washed until neutral to phenolphthalein. The pure white chitin thus obtained which may be dried, is treated with 40% sodium hydroxide at 110° C. for about 4 hours, after which it is filtered and washed until neutral to phenolphthalein, the product being a partially deacetylated chitin. Depending upon the length of treatment and the concentration of the caustic and the temperature, a product of greater or less deacetylation may be obtained. Satisfactory results are obtained in the following processes of this invention with a chitin which has had from .2 to .9 or even nearly all of its acetyl groups removed by hydrolysis. The preferred range of deacetylation is from 70% to 86%.

After drying the partially deacetylated chitin at 65° C., it is dissolved in an aqueous solution of acetic acid in the proportion of 161 parts of deacetylated chitin to 48 parts of acetic acid, the amount of water being such as to give a final solution having the desired concentration, for example 0.05 to 5.0% of deacetylated chitin. The viscous solution of deacetylated chitin thus obtained gives a continuous film on evaporation and is suitable for use in certain of the processes of this invention as such, or it may be diluted. The viscosity of the final solution may be controlled by the use of different temperatures of deacetylation, different concentrations of caustic in the deacetylation, different lengths of caustic treatment in the deacetylation, or by controlled oxidation of the deacetylated product. Thus, the viscosity may be conveniently reduced by treating the deacetylated chitin solution with from 1 to 800 parts per million of hydrogen peroxide at room temperature or by bubbling with air and by continuing the oxidizing treatment until the desired viscosity is attained, which may take several hours. Viscosity may be increased by heating the dry partially deacetylated chitin. Thus, by heating for 12 hours at 100° C. the viscosity of the material measured in 5% neutral solution in acetic acid is increased from 5 poises to 200–300 poises.

The product obtained according to the above treatment is partially deacetylated and substantially non-degraded, i. e., non-depolymerized. Complete deacetylation requires more severe treatment which causes a certain amount of degradation of the deacetylated chitin. The degree of deacetylation and the degree of degradation will depend upon the caustic concentration, the temperature, and the duration of the treatment. Caustic solutions of from 5 to 60% NaOH or KOH, temperatures up to 190° C. and periods of time from 1 to 72 hours may be used, a shorter time and/or a lower temperature being used with the higher concentrations of caustic. Using 5% caustic and a temperature of 150° C. about 24 hours are required to reach a soluble stage of deacetylation, while with 50% caustic at a temperature of 100° C. only about one hour is necessary. Using 40% caustic at a temperature of 100° C. about eighteen hours are required to reach the same degree of deacetylation as in the above two instances. Too great exposure to oxidizing influences during the deacetylation is to be avoided, since this causes substantial degradation of the deacetylated chitin. This can be attained by deacetylating in a closed vessel or one in which access of air to the deacetylation reaction mixture is limited by exposing a surface which is small in relation to the volume of the mixture and avoiding frequent renewal of the surface by too vigorous agitation. The final product is soluble in, or at least completely swollen by, dilute acetic acid. In the case of soluble products, the solution is relatively viscous.

By changing the conditions during deacetylation, products can be obtained varying in properties from the acid and alkali-insoluble chitin through the acid-soluble partially deacetylated chitin and the acid soluble completely deacetylated chitin to the water soluble carbohydrate amine. The water soluble products are of no value for the purposes of the present invention. It is only the acid-soluble materials which can be precipitated by alkali that are of interest, i. e., substantially undegraded materials which give a continuous film on evaporation of their solutions.

The deacetylated chitin to be used in accordance with the processes of the present invention, need not necessarily be in solution. Salts of this material with almost all of the common organic acids and some of the mineral acids are soluble in water. The following table shows the solubility of various salts prepared from deacetylated chitin according to the preferred method given below.

These salts are prepared from substantially undegraded partially deacetylated chitin containing about .8 free amino groups per chitosamine residue.

*Solubility of salts of deacetylated chitin*

| | Acid | Solubility of salt in water | Viscosity of 5% solution in water (poises) |
|---|---|---|---|
| 1 | Acetic | Easily soluble | 66 |
| 2 | Glycollic | do | |
| 3 | Maleic | do | 83.6 |
| 4 | Malonic | do | |
| 5 | Succinic | Slowly soluble | 646 |
| 6 | Oxalic | Difficultly soluble | |
| 7 | Pthalic | Slowly soluble | |
| 8 | Benzoic | Easily soluble | |
| 9 | Benzensulfonic | do | |
| 10 | α-bromo-n-butyric | do | |
| 11 | α-bromo-n-propionic | do | |
| 12 | Phosphoric | Slightly soluble | |
| 13 | Phenyl glycine | do | |
| 14 | Iodoacetic | Easily soluble | |
| 15 | Sulfanilic | do | |
| 16 | Formic | do | |
| 17 | Dichloroacetic | do | |
| 18 | Pyruvic | do | 735 |
| 19 | Lactic | do | |
| 20 | Tartaric | do | 29 |
| 21 | Salicylic | Difficultly soluble | |
| 22 | Adipic | Easily soluble | 71 |
| 23 | Sebacic | do | |
| 24 | Sulfonsalicylic | do | |
| 25 | Citric | do | 34 |
| 26 | Malic | do | 100 |
| 27 | Lauric | Very slightly soluble | |
| 28 | Fumaric | Slowly soluble | |
| 29 | o-Benzoylbenzoic | Difficultly soluble | |
| 30 | Diphenic | do | |
| 31 | Cinnamic | do | |
| 32 | Mandelic | Easily soluble | 107 |
| 33 | Glutamic | do | 82.8 |

*Solubility of salts of deacetylated chitin—Contd.*

| | Acid | Solubility of salt in water | Viscosity of 5% solution in water (poises) |
|---|---|---|---|
| 34 | Hippuric | Easily soluble | 910 |
| 35 | Furioc | do | 75.2 |
| 36 | Phenylacetic | do | |
| 37 | Crotonic | do | |
| 38 | Caproic | do | 712 |
| 39 | Propionic | do | 260 |
| 40 | Butyric | do | 219 |
| 41 | Diethylmalonic | do | |
| 42 | Pelargonic | Difficultly soluble | |
| 43 | Isovaleric | Easily soluble | 275 |
| 44 | Glycine | Difficultly soluble | |
| 45 | Palmitic | Very slightly soluble | |
| 46 | Terephthalic | Slightly soluble | |
| 47 | Chloroacetic | Easily soluble | |
| 48 | α-chloropropionic | do | 121 |
| 49 | α-chloroisobutyric | do | 73.3 |
| 50 | Cyanuric | Very slightly soluble | |
| 51 | Thioglycollic | Easily soluble | |
| 52 | 3-nitrophthalic | do | 48 |
| 53 | α-iodopropionic | do | 139 |
| 54 | Isobutyric | do | 99 |
| 55 | Linoleic | Difficultly soluble | |
| 56 | Anthranilic | Easily soluble | 21.1 |
| 57 | Furacrylic | do | |
| 58 | Hydroxy-Isobutyric | do | 113 |
| 59 | Sodium bisulfite | Difficultly soluble | |
| 60 | Boric | Slightly soluble | |
| 61 | Dithiocarbonic | Slowly soluble | |
| 62 | Sulfurous | Easily soluble | |
| 63 | Hydrochloric | do | |
| 64 | Hydrobromic | do | |
| 65 | Hydroiodic | do | |
| 66 | Hypochlorous | Slowly soluble | |

In the practice of one phase of this invention a cellulosic substance is associated with deacetylated chitin for the preparation of new compositions of matter. The cellulosic substance and the deacetylated chitin may be more or less intimately associated in any suitable manner. Thus, a cellulosic substance may be coated or impregnated with a solution of the deacetylated chitin, deacetylated chitin may be coated or impregnated with a solution of a cellulosic substance, a deacetylated chitin and a cellulosic substance may be dissolved in a suitable solvent or solvent mixture. The cellulosic substance and partially deacetylated chitin, may be mixed, ground, laminated or pressed together. Deacetylated chitin in solution, for example as the acetate, may be used as an adhesive in laminating sheets of paper, regenerated cellulose, or the like.

Having outlined above the general purposes and principles of the invention, the following application of the general principles thereof to certain specific instances are included for purposes of illustration and not in limitation.

*Example 1.*—Unsized sheets of paper made from bleached, 88–89% alpha cellulose content wood fiber were immersed in a 1.5% aqueous solution of partially deacetylated chitin in the form of the acetate salt. After removing the excess solution by suitable means the sheets were dried at a temperature from 90° C. to 105° C. until the sheets were substantially dry and free from the odor of acetic acid. The partially deacetylated chitin content of the sized paper was approximately 2%. This process is known by those familiar with the art as tub sizing. The partially deacetylated chitin sized paper had several times the wet and dry bursting strength of unsized sheets. It had excellent resistance to the penetration of water and a good surface for writing or printing upon with ink while the unsized paper was instantly penetrated by water and the surface of the paper was unsatisfactory for writing or printing upon with ink. While a paper made from bleached pulp containing from 88 to 89% alpha cellulose was used in the above example, the process is not limited to any particular kind of paper pulp or to any given alpha cellulose content in the pulp. Similar improvements were obtainable with partially deacetylated chitin sizing in papers which were made from unbleached kraft fiber or with kraft fiber which had been mercerized in (18%) sodium hydroxide solution prior to the formation of the sheet. Also, partially deacetylated chitin has been used successfully in papers which contained mixtures of fibers such as bleached sulfite in combination with soda pulp or currency paper which contains among other things rag stock and silk fibers.

The exact composition of the material depends upon a number of factors such as the physical nature of the treated paper, the length of time the paper is in the deacetylated chitin solution, the temperature and concentration of the deacetylated chitin solution, the pressure used during the process, the exact method of drying, etc., but regardless of these, the cellulose is intimately associated with the deacetylated chitin being in part coated and in part impregnated therewith. The exact composition of this product which was in solution in the form of its acetate, depends primarily on the length of time the paper is heated during the drying process. During the drying time, a portion of the acetic acid is lost and a part of the deacetylated chitin acetate is converted into deacetylated chitin per se. A portion of the deacetylated chitin acetate may be converted into the parent substance chitin by reaction with the acetic acid with the elimination of water. If the drying time is sufficiently prolonged practically all of the deacetylated chitin acetate may be converted into deacetylated chitin, chitin or both depending on the condition used during the drying process. Usually the deacetylated chitin acetate is converted largely into deacetylated chitin and the acetic acid evaporates. However, if the evaporation of the acetic acid is prevented, as for example when the composition is heated in a closed vessel, the acetic acid may react with the amine group to form the acetyl derivative and water. Suitable conditions may be chosen favoring either reaction depending on the product desired.

The appearance of the new compositions, the preparation of which is described above, is not appreciably different from that of the untreated paper, but the new composition has many advantageous properties for example a higher tensile strength and tear resistance, as well as a high resistance to water.

*Example 2.*—To a beater containing a water slurry of bleached sulfite wood pulp a quantity of a solution of the acetate of partially deacetylated chitin (3% partially deacetylated chitin content) was added which gave a partially deacetylated chitin content of 2% based on the dry weight of fiber. After several minutes of agitation in the beater dilute ammonia was slowly added with further agitation until the sized slurry gave an alkaline reaction with litmus paper. The sized pulp was formed into wet sheets, part of the excess water removed by suitable means and the sheets dried to a moisture content of less than 10% at 90°–105° C. The partially deacetylated chitin sized paper possessed superior properties to paper sized in the beater with rosin size. For example the rosin sized paper had lower wet and dry bursting strengths, equal water resistance and poorer tear resistance on either aged or unaged sheets than did partially deacetylated chitin sized sheets. Partially deacetylated chitin did not discolor the paper like the rosin on aging. Rosin sizing in paper requires precipitation in a slurry which has a pH considerably below 6.0 and the acid remaining in the finished sheet is known to have degrading effects on the paper. In the process of the present invention the partially deacetylated chitin salt is precipitated at a pH of 7.0 or slightly above hence no acid is left in the sheet to weaken the cellulosic material. If a volatile alkali such as ammonia is used, it is quickly and efficiently removed by evaporation during the drying of the paper. In a series of tests identical with the above described process samples of partially deacetylated chitin acetate size whose solution varied in viscosity between wide limits (from 4.2 poises to 188.0 poises for 3% aqueous solution at 25° C.) have been used and the efficiency of the size in the paper was the same in every case. Therefore the viscosity of the partially deacetylated chitin acetate sizing solutions is not limited to any particular range. Although in the above example only 2% of partially deacetylated chitin based on the weight of dry fiber was used, the percentages of partially deacetylated chitin size in paper have been varied and papers with good water repellence and increasing dry and wet strengths parallel to amount of partially deacetylated chitin used have been obtained. For example a paper containing 8% partially deacetylated chitin has practically the same water repellence as one containing 2% but its wet and dry strength is more than doubled. Hence, the scope of the invention is not limited to any particular amount of partially deacetylated chitin size in the paper but to whatever amount is necessary according to the use to which the product is put.

The process may be modified by treating the slurry which has been mixed with the deacetylated chitin solution with an alkaline substance such as ammonia, sodium carbonate, inorganic hydroxides, an amine or the like or even with formaldehyde in order to precipitate the deacetylated chitin on and/or in the wood pulp fibers. Paper prepared from this composition has a high water resistance, and increased wet and dry strength over that of paper prepared from untreated wood pulp. The paper has good resistance to deterioration and discoloration on aging. The finished paper may be treated with acylating agents such as acetic anhydride to convert the deacetylated chitin into an acyl derivative, for example chitin itself. In this form the product is even more insoluble. The resulting product shows very high resistance to oil, grease, water and other substances.

*Example 3.*—Rosin-sized paper is submerged in a 3% solution of deacetylated chitin in dilute acetic acid and, after the excess of the solution has been removed by suitable means, is dried at a temperature of 90 to 100° C. Most of the chitosamine polymer is present in the composition as a surface coating but a part has penetrated into the interior of the paper. The deacetylated chitin acetate is converted, to a greater or less extent, into deacetylated chitin during the drying process, the per cent converted into deacetylated chitin depending upon the length of the drying time and the temperature at which the material is dried. This paper possesses properties rendering it especially suitable for use with printing and writing inks and also has good oil and grease-resistance.

*Example 4.*—A bleached sulfite pulp was beaten until the fibers were shredded and hydrated into what is known as a "slow" stock with a high "freeness". The fiber was sized with 2% partially deacetylated chitin in the beater as described in Example 2 and sheets were formed. The partially dried sheets were hot calendered until substantially dry. The sheets were then tub sized in an aqueous solution of partially deacetylated chitin acetate (which gave a total partially deacetylated chitin content of 4.5% based on the dry fiber content) partially dried, and then hot calendered until dry. The sheets, in addition to having the unusual properties given in Examples 1 and 2 showed excellent resistance to the penetration of oil and grease. Paper made from pulp sized in the beater with partially deacetylated chitin acetate may be lacquered by any suitable means with organic solutions of cellulose derivatives (e. g., cellulose acetate or ethyl cellulose solution) or resins (e. g., solutions of resins made by condensing diphenylolpropane with BB' dichloroethyl ether or polyhydric alcohol-polybasic acid resins or polymers of methyl acrylate or methyl methacrylate). Water dispersible materials may also be used in combination with partially deacetylated chitin salts as paper sizes, for example, rosin, starches, casein, glue, gelatin, polyhydric alcohol-polybasic acid resins soluble in alkaline solutions or emulsifiable in aqueous systems, and water soluble derivatives of methacrylic acid such as the water soluble salts of polymethacrylic acid. These modifying materials may be used in the beater with partially deacetylated chitin salts or they may be used as tub sizes with partially deacetylated chitin salts or the modifying materials may be used alone in the beater. The partially deacetylated chitin salt may be used as a tub size in papers that are beater sized with these modifying materials or the latter may be used as tub sizes on paper made from pulp which has been beater sized with partially deacetylated chitin size. Paper may also be sized on one side only by mechanical methods such as brushing, spraying, etc., to form useful products.

Example 5.—An unsized braided straw hat body is treated with a 3% solution of deacetylated chitin in 3% acetic acid. The excess of the solution is wiped and squeezed off and the straw hat body is allowed to dry after which it is blocked with heat and pressure in the usual manner. Acetic acid is driven off during the blocking process, and the resulting structure comprises straw-coated and/or impregnated with deacetylated chitin. The finished product has the desirable properties of stiffness, gloss, water-resistance, etc.

In the above examples wood pulp, paper and straw are disclosed as organic materials suitable for use in the preparation of the new composition of matter of the present invention. Other cellulosic materials, for example wood, cotton linters, artificially crinkled cellulosic fibers, mercerized fibers, absorbent papers having a substantially porous structure prepared from cotton linters, cotton rags, or artificially crinkled wood pulp fibers, pressed wood such as "masonite", sawdust, wood flour, bagasse, etc., may be employed in the processes of and to form the compositions of the present invention.

The process of the invention is applicable generally to fibrous materials both organic and inorganic, cellulosic and non-cellulosic as disclosed in the following examples:

Example 6.—To a water slurry of asbestos fiber in a beater, a 3% solution of partially deacetylated chitin in the form of the acetate is slowly added until the amount of partially deacetylated chitin is 2% by weight of the fiber. After several minutes of mixing, dilute ammonia is added until the slurry is distinctly alkaline to litmus and the mixing is continued for several minutes. The sized slurry is then formed into sheets on a Fourdrinier paper machine followed by wet pressing and drying at 100–110° C. The dried product is softened by passage through a calender stack.

The process of this example may be varied by impregnating or coating the finished sheet, cord, etc. with partially deacetylated chitin solution or by coating the objects by any suitable means with partially deacetylated chitin acetate solution. The partially deacetylated chitin may be coagulated by heat or by gaseous or aqueous ammonia. The excess water is removed by heating at 100–110° C. or at even higher temperatures.

Asbestos products treated with partially deacetylated chitin as described above possess better repellence to water and organic materials, such as oils and greases, than the untreated products. Partially deacetylated chitin increases the dry and wet strengths of asbestos sheets and also reduces the tendency of the sheets to crack or break upon folding or bending. At elevated temperatures partially deacetylated chitin does not melt or soften nor does decomposition occur below 225° C. and it has therefore been found to be superior in asbestos products to other organic binders and waterproofing agents such as waxes, resins and bituminous materials.

While two distinct methods for applying partially deacetylated chitin to asbestos have been described the process is not limited to one or the other of these methods. Although in the above example 2% by weight of partially deacetylated chitin has been used as a beater size and a 3% solution of partially deacetylated chitin acetate as a coating or impregnating solution the scope of the invention is not limited to amounts of partially deacetylated chitin applied to the asbestos in these examples. Amounts varying between wide limits may be used and the percentage of partially deacetylated chitin present in the final product will be governed largely by the use to which the product is put.

Although asbestos has been used in the above example, the invention is not limited to asbestos. Partially deacetylated chitin may be used in combination with other inorganic fibrous materials such as mineral wools either alone or in combination with asbestos. In the practice of the invention combinations of inorganic fibrous materials and organic fibrous materials may also be used. Asbestos fabric or cord which contains cotton fiber or thread as a strengthening agent may be employed as a base which is treated with partially deacetylated chitin by any suitable means. Various fillers in combination with asbestos or mineral wools may also be used in certain types of material in which partially deacetylated chitin is used as a binder and a protective agent.

Example 7.—Unfinished, tanned soft neck leather is immersed in a 3% solution of partially deacetylated chitin in the form of the acetate. After soaking for some time in the partially deacetylated chitin solution the excess liquid is removed by passing the leather between rolls and the water is removed by drying at temperatures up to 110° C. The leather after the partially deacetylated chitin treatment is denser, tougher, has a better feel, and shows improved resistance to weakening by water. It is also more impervious to dyeing solutions. The process shows particular advantage in the treatment of leather obtained from the areas of the animal hide, such as the neck and belly, which are inferior in density and toughness to leather obtained from the back and butts of animals.

Other cellulosic substances than naturally occurring or mechanically modified naturally occurring cellulosic substances may be employed such as regenerated cellulose, glycol cellulose, cellulose glycollic acid, ethyl cellulose, benzyl cellulose and other cellulose ethers, cellulose acetate, cellulose propionate, cellulose nitrate and other cellulose esters, ethyl cellulose acetate and other mixed ether esters of cellulose, may be employed. These materials are examples of cellulosic materials existing in one form as dense, non-fibrous, substantially impermeable pellicles or films. The cellulose derivatives may be highly substituted for example cellulose tri-acetate or may be low substituted and contain only one substituent group for every four to twenty-four glucose units as in the case of low substituted cellulose glycollic acid. The following examples indicate methods of preparing the new compositions of matter of the present invention with the use of cellulosic substances which have undergone chemical changes.

*Example 8.*—(a) Undried regenerated cellulose foil is immersed in a 1% solution of deacetylated chitin acetate. The wet foil is then dried in air at a temperature of from 60 to 100° C. The resulting product is transparent.

(b) Undried regenerated cellulose foil is immersed in a 1% solution of deacetylated chitin acetate and then passed through a 1% solution of potassium hydroxide. The product is washed free of caustic and dried in air at a temperature of from 80 to 100° C. and is then transparent. In this composition the deacetylated chitin acetate has been completely changed into deacetylated chitin by the action of the alkali.

(c) Undried regenerated cellulose foil is passed through a solution in water containing 1% deacetylated chitin acetate and 4% glycerol, the resulting sheet being dried in the usual manner. The product is flexible, transparent and tough.

Deacetylated chitin maleate or salts of other organic acids may be substituted for the deacetylated chitin acetate of the above examples, the products being similar to those described above. Sheets of glycol cellulose and cellulose glycollic acid may likewise be treated with deacetylated chitin in the manner of the above examples. The process may likewise be applied to threads of regenerated cellulose known to the trade as rayon.

*Example 9.*—Nitrocellulose fibers are submerged in a solution of deacetylated chitin acetate. The fibers are then dried at 80° C. or may be treated with a dilute solution of an alkaline substance to precipitate the deacetylated chitin on the fibers prior to the drying process. The resulting product may be used in the formulation of various nitrocellulose compositions. The nitrocellulose of this example may be replaced by ethyl cellulose and cellulose acetate for the formation of various ethyl cellulose or cellulose acetate compositions.

Solutions of deacetylated chitin containing cellulose derivatives may be prepared as indicated in the following examples.

*Example 10.*—A solution containing 2 grams of solid deacetylated chitin dissolved in 85% acetic acid is added to a solution of 20 grams of low viscosity cellulose acetate dissolved in 80 grams of acetone and 20 grams of ethyl alcohol. The resulting solution may be used as a lacquer or for the casting of transparent sheets of a composition comprising cellulose acetate and a chitosamine polymer. If sheets prepared with the use of this solution are heated for a time at 100° to 110° C., the deacetylated chitin acetate is converted to deacetylated chitin.

Another method of preparing compositions comprising cellulose derivatives and deacetylated chitin is illustrated in the following example of molding powders.

*Example 11.*—Ten grams of cellulose acetate and one gram of deacetylated chitin are intimately mixed by mechanical means and molded at a temperature of 150° C. under pressure. The product is hard, translucent, and iridescent. If the deacetylated chitin and the cellulose acetate are intimately mixed in the presence of solvents, as in Example 10, transparent articles can be molded from the material after the removal of the solvents.

*Example 12.*—Ten parts by weight of ethyl cellulose and two parts by weight of deacetylated chitin are intimately ground together and molded at a temperature of 140° C. under pressure. The resulting products are tough and hard, have a pleasing iridescence and are translucent.

The above examples illustrate the use of deacetylated chitin with non-fibrous cellulosic substances.

In the examples deacetylated chitin acetate dissolved in water or acetic acid has been used as the deacetylated chitin salt but other deacetylated chitin salts are also suitable, for example, the deacetylated chitin salts which are described in copending application of George W. Rigby Serial No. 731,600 of June 21, 1934. Among the derivatives which may be used are the following:

1. Salts of monobasic aliphatic acids, such as acetic, propionic, isobutyric, and the like, and of their derivatives such as chloroacetic, alpha bromo-normal-butyric, dichloroacetic, trimethylacetic, glycollic, lactic, hydracrylic, hydroxyisobutyric, acrylic, methacrylic, crotonic, levulinic, acetoacetic, pyruvic, and the like. In some cases it may be desirable to use salts of higher acids, such as lauric, palmitic, stearic, linoleic and the like.

2. Polybasic acids, such as succinic, malonic, phthalic, azelaic, sebacic, oxalic, malic, tartaric, citric, maleic, fumaric, diglycollic, dilactylic, and the like.

3. Acids containing aromatic nuclei, such as benzoic, benzenesulfonic, sulfanilic, cinnamic, benzolybenzoic, phenylacetic, and the like.

4. Other acids, such as naphthenic, furylacrylic, thioglycollic, cyanuric, hippuric acids, glycerine, and the like.

5. Inorganic acids. In certain cases, when desirable, salts of inorganic acids may be used such as hydrochloric, phosphoric, sulphuric, hydrobromic, boric, sulphurous, and of acidic salts of polybasic acids such as sodium bisulfite, sodium bisulfate, sodium dihydrogen phosphate, and the like.

For the practice of certain phases of the invention it is not necessary that the deacetylated chitin salt be soluble. Some deacetylated chitin salts and particularly the salts of inorganic acids are not entirely soluble, but this property may not prevent their use in the processes of the new compositions of matter of the present invention. In some cases it is particularly advantageous to use an insoluble salt.

The processes and the proportions of materials as well as the materials themselves given in the above examples may be varied.

Fabrics to be treated according to the process of the present invention are first impregnated in a solution of the deacetylated chitin in a dilute acid. Thirty-eight parts of the partially deacetylated chitin and 12 parts of acetic acid in 950 parts of water give a satisfactory solution containing 5% of the salt of the deacetylated chitin. This solution can be diluted to any desired extent with water. For fabrics, a solution containing from 0.5 to 5% of the salt gives good results. After the fabric is impregnated with the solution it is run through squeeze rolls to remove the excess solution. The size may be rendered insoluble by treating in an alkaline bath or by drying and heating to 100° C. for about 15 minutes. The acetate is decomposed by the heating and the acetic acid evaporates leaving the deacetylated chitin insoluble. Other methods of insolubilizing the deacetylated chitin such as treatment with insolubilizing salts such as chrome alum, treatment with ketene, acetic anhydride, acid chlorides or the like, may be used.

The following examples indicate the use of deacetylated chitin with fabrics representing fibrous materials in addition to those disclosed above.

*Example 13.*—Seventy-six grams of deacetylated chitin prepared as disclosed above was dissolved in 2,160 grams of water containing 24 grams of acetic acid. The resulting solution, containing 4% of the salt of deacetylated chitin, was used to impregnate an 80/60 unfinished cotton fabric. After thorough impregnation with the solution the fabric was run through squeeze rolls to remove the excess solution, then dried, and heated 10 minutes at 100° C. to fix the size on the cloth. Under the influence of the heat the acetate decomposes to some extent with liberation of acetic acid, and the insoluble deacetylated chitin was left on the fabric. The finished fabric was stiffer and fuller than the original fabric and this finish was not greatly affected by boiling for one-half hour in 0.5% soap solution.

*Example 14.*—An 80/60 unfinished cotton fabric was impregnated with a 4% solution of deacetylated chitin made according to the methods disclosed above. Cloth was run through squeeze rolls and into a bath of 5% ammonium hyroxide to precipitate the deacetylated chitin on the fabric. The fabric was rinsed in water and dried by ironing. A finish was obtained which was not completely removed by several successive launderings.

*Example 15.*—A coarse, unfinished 48/48 cotton fabric was treated with a 2% solution of deacetylated chitin in aqueous acetic acid, run through squeeze rolls to remove excess solution, dried, and heated 10 minutes at 100° C. A fairly laundry-fast finish was obtained.

*Example 16.*—A sample of unfinished cotton voile was impregnated with a 2% solution of the acetate of deacetylated chitin, run through squeeze rolls, dried, and heated 10 minutes at 100° C. An organdy finish was obtained which was resistant to laundering.

*Example 17.*—An unfinished cotton voile was treated with a 4% solution of the maleic acid salt of deacetylated chitin, run through squeeze rolls to remove excess solution and into a bath containing 5% sodium hyroxide to precipitate the carbohydrate amine polymer on the fabric. A durable organdy effect was obtained.

*Example 18.*—An unfinished fur-felt hat was sponged with a 2% solution of the acetate of deacetylated chitin until the felt was saturated. It was then air dried, steamed lightly and placed in a hat ironing machine. After ironing and creasing, the hat was heated for 25 minutes at 100° C. in an electric oven. The finished hat had a very good sheen and springiness. It was not readily wet by water and it retained its shape and "life" for an unusually long time during regular wear.

*Example 19.*—A wool-felt hat was treated with a 1% solution of the benzoic acid salt of deacetylated chitin until 1.5% of the salt had been taken up, calculated on the dry weight of the hat. A very good stiffening and sizing effect was obtained.

Solutions of deacetylated chitin are applicable to fabrics based on silk, wool, rayon, and linen, as well as the cotton and felt fabrics disclosed in several examples. Rugs and carpets may be thus freshened and sized.

Fabrics sized with a solution of a salt of deacetylated chitin have certain highly desirable properties. Fabrics so treated have imparted to them a greater stiffness and fullness. The treatment also improves the appearance of fabrics by adding to their lustre. The colors of printed fabrics are brightened. The finish is superior in these respects to the ordinary sizing agents based on starch and/or gums. In addition to all the advantages of ordinary sizes deacetylated chitin has other advantageous properties. The most important, perhaps, is in the property of resistance to laundering of the deactylated chitin by alkali. In this respect the deacetylated chitin sizes differ markedly from the ordinary sizes which are largely removed by one washing. Yarns, filaments, threads, fibers, and other fibrous materials may be sized with deacetylated chitin by the processes of the present invention. Fabrics may be laminated to each other or to paper and the like by means of a deacetylated chitin adhesive, such as deacetylated chitin. These laminated fabrics are quite impervious to the passage of liquids and gases. The laminated fabrics may be used in collars.

Any or all of the following may be used with deacetylated chitin salts in formulating sizing compositions: starches, dextrin, gums such as gum tragacanth, glycerol, sulfonated oils, alkali alkyl sulfates such as "hymolal salts", higher straight chain or branched chain alcohols, etc.

The term "substantially undegraded" is used in the sense familiar in the cellulose art, of a material capable of depositing a continuous film when deposited from solution, e. g., deacetylated chitin from an acetic acid solution.

The scope of the term "cellulosic substances" includes naturally-occurring materials of a cellulosic nature, technical products prepared from cellulosic materials and cellulose derivatives in any form, all of which contain the cellulosic nucleus.

The scope of the term "deacetylated chitin" includes when not linked with the words salt or solution not only the deacetylated chitin per se but also salts, reaction products, and chemical derivatives of deacetylated chitin.

The above description and examples are intended to be illustrative only. Any modification of or variation therefrom which conforms to the spirit of the invention is intended to be included within the scope of the claims.

I claim:

1. A composition of matter comprising an at least partially deacetylated, substantially undegraded chitin, intimately associated with a member of the class consisting of fibrous materials and cellulosic substances.

2. A composition of matter comprising an at least partially deacetylated, substantially undegraded chitin, intimately associated with a fibrous material.

3. Process of sizing fibrous material which comprises impregnating the same with a solution of a soluble salt of an at least partially deacetylated, substantially undegraded chitin.

4. Process of sizing fibrous material which comprises impregnating the same with a solution of a soluble salt of an at least partially deacetylated, substantially undegraded chitin, and insolubilizing said deacetylated chitin.

5. Process of sizing a fabric which comprises impregnating said fabric with a solution of a salt of an acid with an at least partially deacetylated chitin.

6. Process of sizing a fabric which comprises impregnating said fabric with a solution of a salt of an organic acid with an at least partially deacetylated chitin.

7. Process of sizing cotton fabric which comprises impregnating said fabric with a solution of a salt of an at least partially deacetylated chitin.

8. Process of sizing cotton fabric which comprises impregnating said fabric with a solution containing from 0.5 to 5.0% of the acetate of partially deacetylated chitin, drying the impregnated fabric and heating the same for approximately ten minutes at approximately 100° C.

9. A fabric sized with an at least partially deacetylated chitin.

10. A cotton fabric sized with an at least partially deacetylated chitin.

11. A new composition of matter comprising a cellulosic substance intimately associated with an at least partially deacetylated, substantially undegraded chitin.

12. Composition of matter comprising paper impregnated with an 85 to 90% deacetylated chitin.

13. A composition of matter comprising regenerated cellulose intimately associated with a substantially undegraded at least partially deacetylated chitin.

14. The process which comprises incorporating an at least partially deacetylated chitin with a cellulosic substance.

15. The process which comprises treating a cellulosic substance with a solution of deacetylated chitin acetate.

16. The process which comprises impregnating paper with an approximately 1.45% solution of an 85 to 90% deacetylated chitin in 3% acetic acid and drying the impregnated paper at 90 to 110° C.

17. A deacetylated chitin coated article of manufacture.

18. A new composition of matter comprising a base of a dense, non-fibrous and substantially impermeable cellulosic substance and associated therewith and thereon a layer of an at least partially deacetylated, substantially undegraded chitin.

19. A new composition of matter comprising a base of a regenerated cellulose film and associated therewith and thereon a film of at least partially deacetylated, substantially undegraded chitin.

20. The process which comprises impregnating paper with a solution of a salt of deacetylated chitin and drying the impregnated paper.

21. The process which comprises impregnating rosin sized paper with a solution of a salt of deacetylated chitin and drying the impregnated paper.

WARNER J. MERRILL.

CERTIFICATE OF CORRECTION.

Patent No. 2,047,218.

July 14, 1936.

WARNER J. MERRILL.

It is hereby certified that error appears in the printed specification of the above numbered patent requiring correction as follows: Page 2, first column, line 58, in the table, Acid No. 7, for "Pthalic" read Phthalic; and second column, line 7, in the table, Acid No. 35, for "Furioc" read Furoic; page 5, second column, line 58, for "glycerine" read glycine; page 6, second column, line 35, after the word "chitin" insert precipitated on the fabric from its acid solution; and line 43, for "ilke" read like; and that the said Letters Patent should be read with these corrections therein that the same may conform to the record of the case in the Patent Office.

Signed and sealed this 29th day of September, A. D. 1936.

Henry Van Arsdale (Seal)

Acting Commissioner of Patents.